Dec. 15, 1931.  A. URFER  1,836,634
EXPANSIBLE DIAPHRAGM BOX AND METHOD OF MAKING THE SAME
Filed Oct. 31, 1929
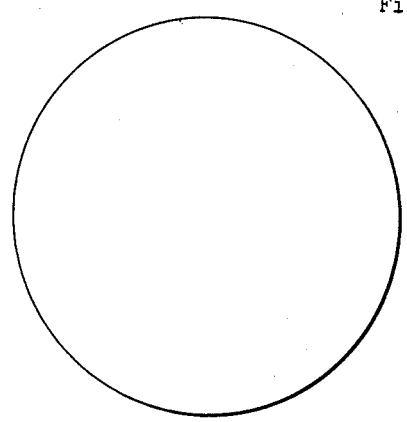
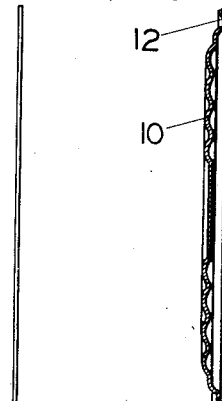
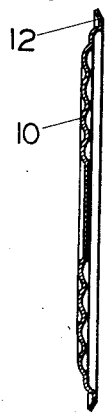
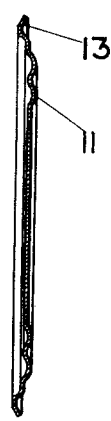
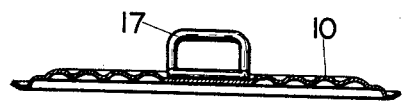
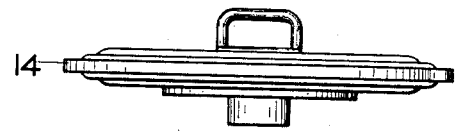
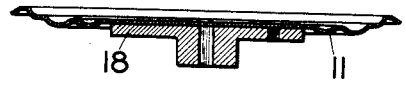
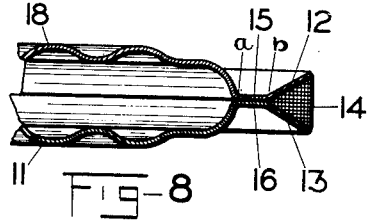
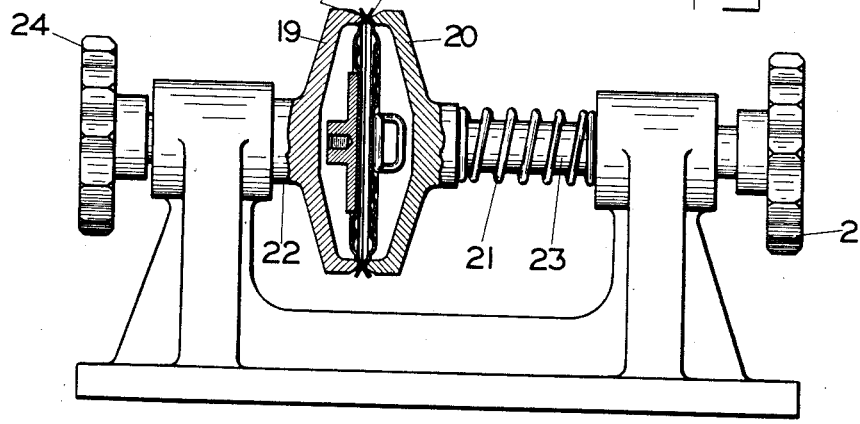
INVENTOR.
ADOLF URFER
BY
ATTORNEYS.

Patented Dec. 15, 1931

1,836,634

UNITED STATES PATENT OFFICE

ADOLF URFER, OF BROOKLYN, NEW YORK, ASSIGNOR TO PIONEER INSTRUMENT COMPANY, INCORPORATED, OF BROOKLYN, NEW YORK, A CORPORATION OF NEW YORK

EXPANSIBLE DIAPHRAGM BOX AND METHOD OF MAKING THE SAME

Application filed October 31, 1929. Serial No. 403,886.

This invention relates to expansible diaphragm boxes such as are used in certain types of precision measuring instruments.

A common mode of fabricating a diaphragm box involves the step of uniting together two metallic diaphragms or flexible pans having rim portions extending axially of the box and overlapping one another. Such expansible diaphragm boxes are usually made air tight by soldering the two overlapping rims of the diaphragms and it frequently happens that expansible diaphragm boxes made in this manner fail because of leakage occurring as the result of the parting of the bond between the solder and the diaphragms. A study of the cause of failure indicates that such failures occur because of the non-flexibility of the solder or other sealing material used to maintain together the more flexible metal diaphragms constituting the expansible portions of the diaphragm boxes. In accordance with my invention I construct expansible diaphragm boxes which have their united portions, and hence their non-yielding solder-restricted portions, outside the yieldable areas of the diaphragms and beyond the range of any deleterious influence of flexible areas.

It is among the objects of my invention to provide an expansible diaphragm box which has its oppositely disposed metallic pans or diaphragms secured together in such a manner that the natural flexing occurring at and near the outer edges of the diaphragms does not cause undesirable strain to be placed upon the solder or other sealing material used to maintain the two diaphragms together.

Other objects and advantages will be made apparent hereinafter in the disclosure of the invention and in the claims which follow:

In the drawings

Figure 1 is a plan of a disk of metal from which a diaphragm may be fashioned.

Fig. 2 is an edge view of the disk illustrated in Fig. 1.

Fig. 3 is a section of a diaphragm after it has been stamped.

Fig. 4 is a section of the companion diaphragm, which, when united with the diaphragm of Fig. 3, forms an expansible box.

Fig. 5 is a section of the diaphragm shown in Fig. 3 with a bridge attached thereto.

Fig. 6 is a section of the diaphragm illustrated in Fig. 4 with an anchoring boss attached thereto.

Fig. 7 is an outside edge view of a completed expansible diaphragm box.

Fig. 8 is a cross-sectional detail of the edge of a completed diaphragm box.

Fig. 9 illustrates a jig by which the separate diaphragms of the diaphragm box may be held together while their edges are being sealed.

Expansible diaphragm boxes have utility on sensitive pressure gauges, hydrostatic fuel gauges, air speed indicators, altimeters, rate of climb instruments, aneroid barometers and similar types of instruments. In many of these instruments, particularly those relied upon for aircraft navigation, it is important that the various elements within the instruments be of a very high class construction and reliable beyond question of doubt.

An expansible diaphragm box is a very important element of many precision instruments, but it is readily appreciated that even the smallest leakage such as could occur by any parting of the seal between two diaphragms would render an instrument absolutely unreliable and might even be the cause of very serious results following reliance upon the reading of a defective instrument during a particular maneuver. Consequently it is of paramount importance that diaphragm boxes be so made as to be able of standing vigorous tests and extreme conditions such as are due to high vibration and changes of temperature and pressure to which all aeronautical instruments are subjected. As indicated above, solder adhering to a flexible element is likely to have the bond between the solder and the element destroyed because of the difference in flexibility of the solder and the element. This is a principal cause of failure of expansible boxes and one which I correct by my present invention.

In order to keep the solder or other sealing material away from the working surfaces of the diaphragms, I cause the peripheral portions of the diaphragms to be so stamped that when two diaphragms 10, 11 are placed together as illustrated in Fig. 8, the peripheral portions 12, 13 diverge from one another and form a groove therebetween. These peripheral portions 12, 13 may be formed when the diaphragms are corrugated during stamping operations. In Figs. 3 and 4 I have illustrated a pair of diaphragms which are corrugated and have their edges bent away from each other. The sealing material which is used to fasten the two diaphragms together is caused to fill the groove between the peripheral portions 12, 13 which encircles the diaphragm box. Because of the metallic character of the diaphragms solder is preferred as sealing material and when it is placed within the groove it forms an annular ring 14, Fig. 8, which adheres to both peripheral portions 12, 13.

I prefer to have the diverging peripheral portions 12, 13, whatever form they may be given, radially spaced from the working portions of the diaphragm so that when the diaphragms flex during use their area of flexture may not extend to any portion thereof which is faced with solder. To this end the diverging peripheral portions 12, 13 preferably may be separated from the working portions of the diaphragms by ring portions 15, 16, Fig. 8, of the respective diaphragms. These ring portions 15, 16 have contacting surfaces which are secured to one another by solder thereby preventing flexing of the diaphragms from being carried through to the edges where the bond of the solder ring 14 might be endangered. It will be apparent that the flexing of the metallic diaphragms may not, under ordinary conditions, extend beyond the point $a$ and, under most extreme conditions, would not affect the metal of the diaphragms more than a short distance outwardly from point $a$. I have found that the bond between the solder ring 14 and the peripheral portions 12, 13 of the respective diaphragms remains undisturbed even though the diaphragms have been worked excessively beyond any conditions possible of being encountered during use.

The ring portion $a$—$b$ serves other purposes besides that of spacing the peripheral portions 12 and 13 from the corrugated surfaces in that it affords a convenient means of clamping together the adjacent diaphragms. Annular rings of a clamp may engage with the ring portion whose radial measurement is defined by $a$—$b$.

In the manufacture of an expansible diaphragm box two circular metallic disks are cut and corrugated. One of the disks then has attached thereto a bridge 17 to which moving mechanism of an instrument may be attached. The other disk 11 has attached thereto an anchoring boss 18 by which the expansible diaphragm box may be anchored to a frame or to some other fixed support associated with an instrument. If desired, the bridge 17 and the anchoring boss 18 need not be attached to their respective diaphragms until the box has been formed.

For forming the box I have found it convenient to center and maintain together the two diaphragms by means of a jig such as is illustrated in Fig. 9. This jig has two jaws 19, 20 which are spring pressed together by some such means as a spring 21. The jaws 19 and 20 are mounted upon freely rotatable members, 22, 23 which may be rotated individually or, when in use, together by knobs 24, 25. The jaws 19, 20 have annular portions 26, 27 which engage with the outer surface of the respective diaphragms 10, 11 at the ring portion whose radial measurement is indicated as $a$—$b$ in Fig. 8. The spring pressed jaws 19, 20 maintain the ring portions 15, 16 in close adherence to one another. The edge portions 12, 13 of the respective diaphragms diverge from one another and form a groove therein entirely surrounding the diaphragm box, and, by the use of the jig just described or some other similar and convenient device, a workman may readily permanently unite the two diaphragms 10, 11 together by running solder between the edge portions 12, 13. The solder used forms an annular ring 14 to which each of the ring portions 12, 13 are bonded.

In practicing my invention it is important only that the diverging edges 12, 13 be so formed as to accommodate the ring of sealing material without permitting the same to flow onto the working surfaces of the diaphragms. The absence of a non-pliable sealing material such as solder from the working surfaces of the diaphragms improves the working qualities of expansible diaphragm boxes as well as contributes to longer and more dependable use. Diaphragm boxes made up of more than two diaphragms may have each of the several pairs of contacting edges united together by a ring of solder within a peripheral groove whether the groove be outside of the box, as in the present instance, or whether the groove be within the box as would be the case when the united edges of two adjacent diaphragms constitute the edges of holes through the diaphragms.

I claim:

1. An expansible diaphragm box comprising two metallic diaphragms having united abutting edge portions forming a ring of substantial width, said edge portions having diverging peripheral portions extending from the ring and forming a peripheral groove beyond the area of flexure of the diaphragms, and relatively non-pliable material within said groove and adhering to each of the diaphragms.

2. The method of making expansible diaphragm boxes, which comprises stamping a pair of metallic disks to form corrugated flexible diaphragms having flat spacing portions extending beyond the flexible area of the diaphragms and flange portions bent out of the plane of the disks and extending from said spacing portions, uniting said diaphragms so that the spacing portions abut each other to form a ring for preventing the flexing of the diaphragms from being carried therebeyond while the outwardly bent flange portions form a peripheral groove, and placing sealing material into the peripheral groove to securely hold said diaphragms in united relation and prevent leaks in the expansible box thus formed.

3. The method of making expansible diaphragm boxes, which comprises stamping a pair of metallic disks to form corrugated flexible diaphragms having flat spacing portions extending beyond the flexible area of the diaphragms and flange portions bent out of the plane of the disks and extending from said spacing portions, uniting said diaphragms so that the spacing portions abut each other to form a ring for preventing the flexing of the diaphragms from being carried therebeyond while the outwardly bent flange portions form a peripheral groove, and placing sealing material between the spacing portions and into the peripheral groove to securely hold said diaphragms in united relation and prevent leaks in the expansible box thus formed.

4. An expansible diaphragm box comprising two oppositely disposed diaphragms having flat circumferential portions secured together to form a flat annular portion of substantial radial width extending beyond the flexible area of the diaphragms, diverging peripheral flanges formed integral with the diaphragms and extending from the flat annular portion to form a peripheral groove, and sealing material within said groove uniting the edges of the two diaphragms, said flat annular portion preventing flexing of the diaphragms therebeyond so that the sealing material in the groove is not disturbed and leaks in the diaphragm box are prevented.

In testimony whereof I hereto affix my signature.

ADOLF URFER.